(12) United States Patent
Paik et al.

(10) Patent No.: US 8,583,364 B2
(45) Date of Patent: Nov. 12, 2013

(54) NAVIGATION METHOD OF MOBILE TERMINAL AND APPARATUS THEREOF

(75) Inventors: Woo-Hyun Paik, Gwacheon (KR); Han-Sung Lee, Seoul (KR); Kyoung-Hwa Kim, Yongin (KR)

(73) Assignee: LG Electronics Inc., Seoul (KR)

( * ) Notice: Subject to any disclaimer, the term of this patent is extended or adjusted under 35 U.S.C. 154(b) by 553 days.

(21) Appl. No.: 12/819,772

(22) Filed: Jun. 21, 2010

(65) Prior Publication Data

US 2011/0093194 A1 Apr. 21, 2011

(30) Foreign Application Priority Data

Oct. 15, 2009 (KR) .................. 10-2009-0098427

(51) Int. Cl.
*G01C 21/32* (2006.01)

(52) U.S. Cl.
USPC ............................ 701/425; 701/450; 701/523

(58) Field of Classification Search
USPC .................... 701/425, 450, 451, 461, 523
See application file for complete search history.

(56) References Cited

U.S. PATENT DOCUMENTS

| | | | |
|---|---|---|---|
| 6,256,579 B1 * | 7/2001 | Tanimoto ...................... 701/533 |
| 6,418,373 B1 * | 7/2002 | Omi et al. ..................... 701/411 |
| 6,708,113 B1 * | 3/2004 | Von Gerlach et al. ........ 701/418 |
| 7,302,338 B2 * | 11/2007 | Petzold et al. ................ 701/424 |
| 7,345,699 B2 * | 3/2008 | Janssen ......................... 348/148 |
| 7,623,963 B2 * | 11/2009 | Nomura ........................ 701/417 |
| 8,103,448 B2 * | 1/2012 | Nomura ........................ 701/411 |
| 2008/0065327 A1 * | 3/2008 | Sobue ........................... 701/211 |
| 2008/0120171 A1 * | 5/2008 | Ikeuchi et al. ................. 705/13 |

FOREIGN PATENT DOCUMENTS

| | | | | |
|---|---|---|---|---|
| JP | 07168995 A | * | 7/1995 |
| JP | 08271272 A | * | 10/1996 |
| JP | 10332391 A | * | 12/1998 |
| JP | 2001208560 A | * | 8/2001 |
| JP | 2003121161 A | * | 4/2003 |
| JP | 2006003199 A | * | 1/2006 |
| JP | 2007120949 A | * | 5/2007 |
| JP | 2008020414 A | * | 1/2008 |
| JP | 2008039687 A | * | 2/2008 |
| JP | 2008241418 A | * | 10/2008 |
| WO | WO 2009053792 A2 | * | 4/2009 |

OTHER PUBLICATIONS

JPO machine translation of JP 2001-208560.*
JPO machine translation of JP 07-168995.*
JPO machine translation of JP 2001-208560 (original JP document published Aug. 3, 2001).*
JPO machine translation of JP 07-168995 (original JP document published Jul. 4, 1995).*

* cited by examiner

*Primary Examiner* — James Trammell
*Assistant Examiner* — David Testardi
(74) *Attorney, Agent, or Firm* — Birch, Stewart, Kolasch & Birch, LLP

(57) ABSTRACT

A navigation method and apparatus of a mobile terminal capture an image of a road on which a driver is driving a vehicle if the road is a new road which has not been updated on map data, automatically generates guidance information of the captured road, and provide a user preference route in searching a route from a current location to a destination to thereby enhance user satisfaction. The navigation apparatus of a mobile terminal includes a storage unit configured to store map data, a display unit configured to display a route from a current location to a destination on the map data, and a controller configured to store locus information of a vehicle in real time when the vehicle gets off of the route and gives a weight value to a link corresponding to the locus information.

9 Claims, 10 Drawing Sheets

NAVIGATION METHOD OF MOBILE TERMINAL AND APPARATUS THEREOF

CROSS-REFERENCE TO A RELATED APPLICATION

Pursuant to 35 U.S.C. §119(a), this application claims the benefit of earlier filing date and right of priority to Korean Application No. 10-2009-0098427 filed on Oct. 15, 2009, the contents of which are incorporated by reference herein in its entirety.

BACKGROUND OF THE INVENTION

1. Field of the Invention

The present invention relates to a navigation method and apparatus of a mobile terminal.

2. Description of the Background Art

In general, a vehicle navigation apparatus generates road guide information based on a global positioning system (GPS) signal and map information and provides the generated road guide information to a user.

SUMMARY OF THE INVENTION

According to an aspect of the present invention, there is provided a navigation apparatus of a mobile terminal, including: a storage unit configured to store map data; a display unit configured to display a route from a current location to a destination on the map data; and a controller configured to store locus information of a vehicle in real time when the vehicle gets off of the route and giving a weight value to a link corresponding to the locus information.

According to another aspect of the present invention, there is provided a navigation method of a mobile terminal, including: storing map data; displaying a route from a current location to a destination on the map data; when a vehicle gets off of the route, storing locus information of the vehicle in real time; and giving a weight value to a link corresponding to the locus information.

The foregoing and other objects, features, aspects and advantages of the present invention will become more apparent from the following detailed description of the present invention when taken in conjunction with the accompanying drawings.

DETAILED DESCRIPTION OF THE INVENTION

A navigation method and apparatus of a mobile terminal capable of capturing an image of a road on which a user (i.e., a driver) is driving a vehicle if the road is a new road which has not been updated on map data, automatically generating guidance information of the captured road, and providing a user preference route in searching a route from a current location to a destination to thereby enhance user satisfaction, according to exemplary embodiments of the present invention will now be described with reference to FIGS. 1 to 12. Any road not reflected on the map data is considered a new road, regardless of when it was constructed.

Figure 1:
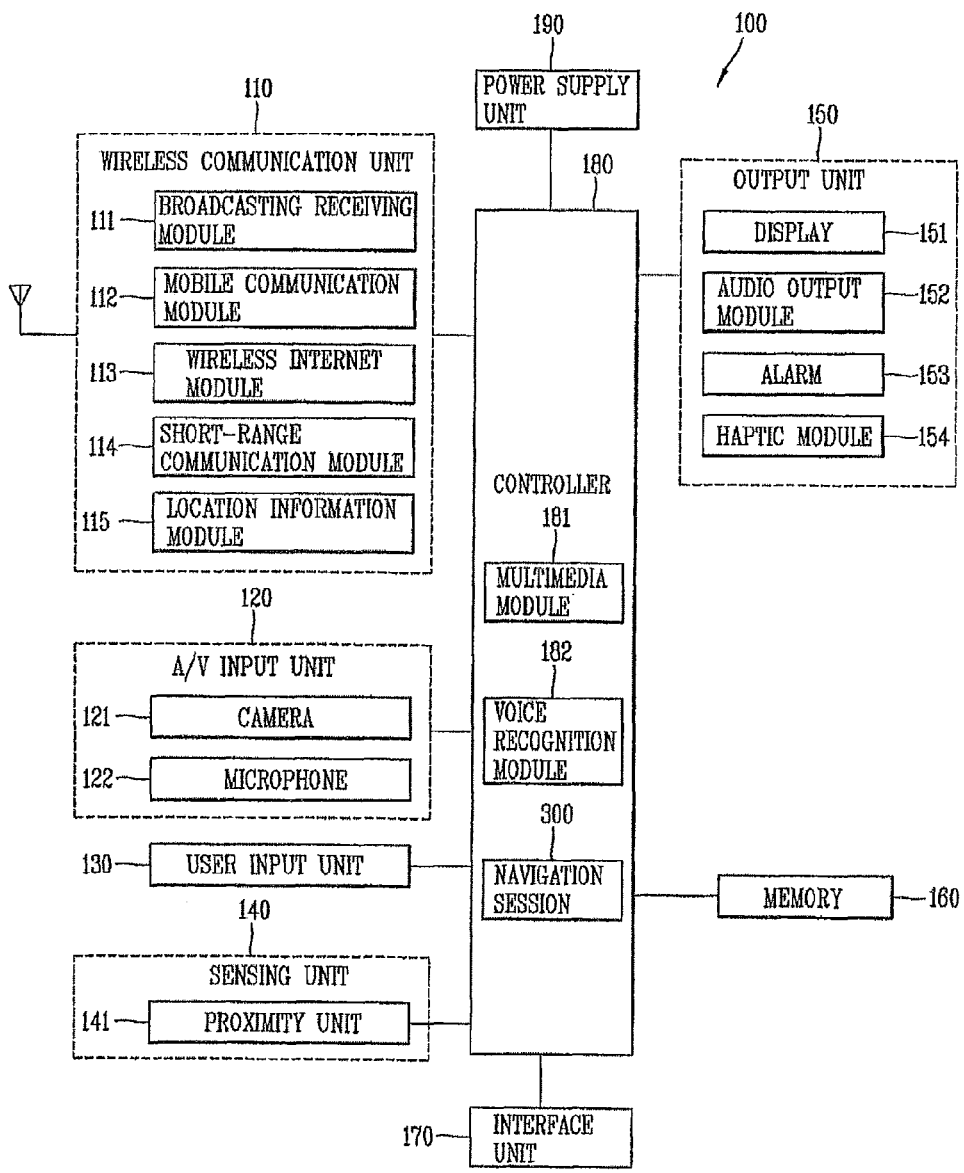
FIG. 1 is a schematic block diagram of a mobile communication terminal according to an exemplary embodiment of the present invention.

FIG. 1 is a schematic block diagram showing the configuration of a mobile communication terminal employing an image display apparatus according to an exemplary embodiment of the present invention. The mobile communication terminal 100 may be implemented in various forms such as mobile phones, smart phones, notebook computers, digital broadcast terminals, PDAs (Personal Digital Assistants), PMPs (Portable Multimedia Player), etc.

As shown in FIG. 1, the mobile communication terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile communication terminal 100 having various components, but it is understood that implementing all of the illustrated components is not a requirement. The mobile communication terminal 100 may be implemented by greater or fewer components.

The wireless communication unit 110 typically includes one or more components allowing radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the terminal. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal (when the mobile communication terminal is located in a vehicle, the location of the vehicle can be checked). For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile communication terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi position system and/or hybrid positioning system may be used.

The A/V input unit 120 is configured to receive an audio or video signal. The AN input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile communication terminal 100 such as an opened or closed state of the mobile communication terminal 100, a location of the mobile communication terminal 100, the presence or absence of user contact with the mobile communication terminal 100 (i.e., touch inputs), the orientation of the mobile communication terminal 100, an acceleration or deceleration movement and direction of the mobile communication terminal 100, etc., and generates commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile communication terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating user's authority for using the mobile communication terminal 100 and may include a user identity module (UIM), a subscriber identity module (SIM) a universal subscriber identity module (USIM), and the like.

In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile communication terminal 100 or may be used to transfer data between the mobile communication terminal and an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units (or other display means) according to its particular desired embodiment. For example, the mobile terminal may include both an external display unit (not shown) and an internal display unit (not shown).

Meanwhile, when the display unit 151 and the touch pad are overlaid in a layered manner to form a touch screen, the display unit 151 may function as both an input device and an output device. The touch sensor may have the form of, for example, a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input position and a touch input area. When there is a touch input with respect to the touch sensor, the corresponding signal(s) are sent to a touch controller (not shown). The touch controller processes the signal(s) and transmits corresponding data to the controller 180. Accordingly, the controller 180 can recognize a touched region of the display unit 151.

A proximity sensor 141 of the mobile communication terminal 100 will now be described with reference to FIG. 2.

Figure 2:
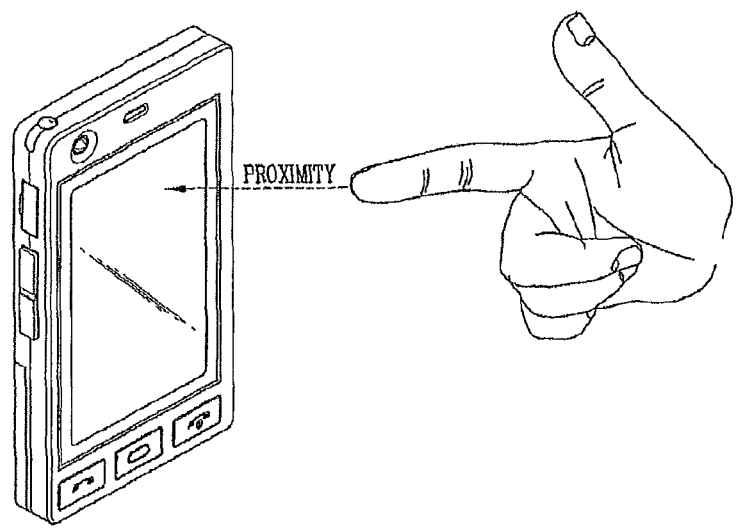
FIG. 2 illustrates a proximity touch of the mobile communication terminal according to an exemplary embodiment of the present invention.

FIG. 2 illustrates a proximity touch for explaining a data display method according to an exemplary embodiment of the present invention. A proximity touch Proximity touch refers to recognition of the pointer positioned to be close to the touch screen without being in contact with the touch screen.

The proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected based on a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, a touch input etc. In addition to video or audio signals, the alarm unit 153 may output signals in a different manner, for example, to inform about an occurrence of an event. The video or audio signals may be also outputted via the audio output module 152, so the display unit 151 and the audio output module 152 may be classified as parts of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

The voice recognition module 182 recognizes a voice pronounced by the user and performs a corresponding function according to the recognized voice signal.

A navigation session 300 applied to the mobile terminal 100 displays a travel route on map data.

Figure 3:
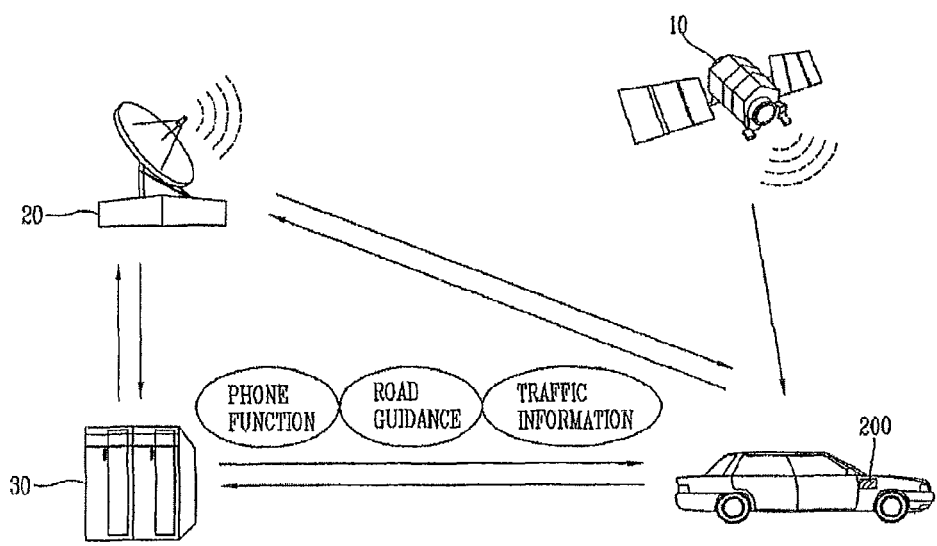
FIG. 3 is a schematic block diagram of a vehicle navigation system according to an exemplary embodiment of the present invention.

FIG. 3 is a schematic block diagram showing a vehicle navigation system according to an exemplary embodiment of the present invention.

As shown in FIG. 3, the vehicle navigation system includes an information providing center 30 for providing traffic information and various data (e.g., programs, execution files, etc.); and a telematics terminal 200 that is mounted within a vehicle, receives traffic information via a remote wireless communication network 20 and/or short-range wireless communication network, and provides a road guidance service based on a GPS signal received via an artificial satellite 10 and the traffic information.

The configuration of the telematics terminal 200 according to an exemplary embodiment of the present invention will now be described with reference to FIG. 4.

Figure 4:
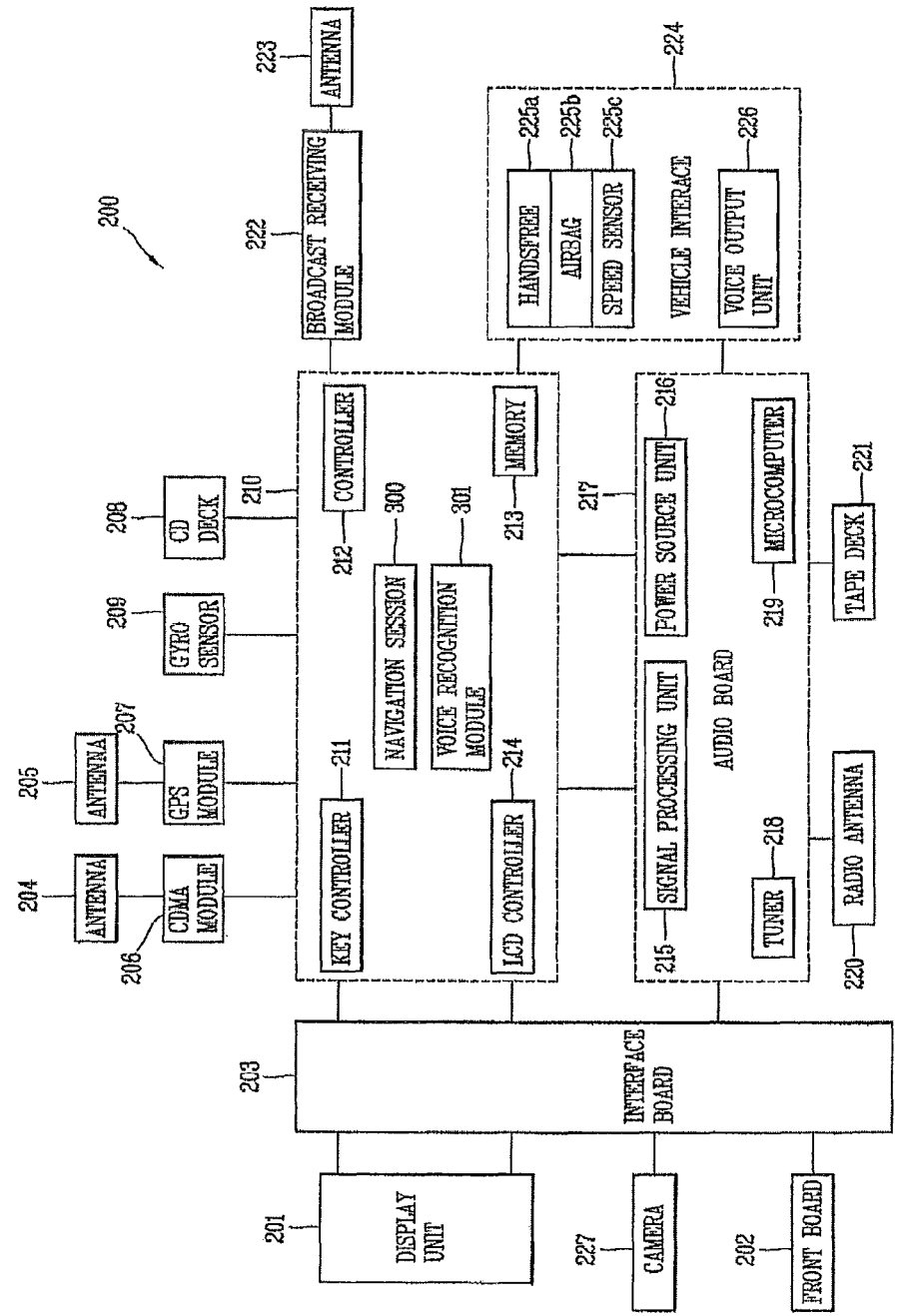
FIG. 4 is a schematic block diagram showing a telematics terminal according to an exemplary embodiment of the present invention.

FIG. 4 is a schematic block diagram showing a telematics terminal employing the vehicle navigation apparatus according to the present invention.

As shown in FIG. 4, the telematics terminal 200 includes a main board 210 including a CPU (Central Processing Unit) 212 for controlling the telematics terminal 200 overall, a memory 213 for storing various information, a key controller 211 for controlling various key signals, and an LCD controller 214 for controlling an LCD.

The memory 213 stores map information (map data) for displaying road guidance information on a digital map. Also, the memory 213 stores a traffic information collecting control algorithm for inputting traffic information according to the situation of a road along which the vehicle currently travels (runs), and information for controlling the algorithm.

The main board 210 includes a CDMA module 206, a mobile terminal having a unique device number as assigned and installed in the vehicle, a GPS module 207 for guiding a location of the vehicle, receiving a GPS signal for tracking a travel route from a start point to a destination, or transmitting traffic information collected by the user as a GPS signal, a CD deck 208 for reproducing a signal recorded in a CD (Compact Disk), a gyro sensor 209, or the like. The CDMA module 206 and the GPS module 207 receive signals via antennas 204 and 205.

A broadcast receiving module 222 is connected with the main board 210 and receives a TV signal via a TV antenna 223. A display unit (i.e., an LCD) 201 under the control of the LCD controller 214, a front board 202 under the control of the key controller 211, and a camera 227 for capturing the interior and/or the exterior of a vehicle are connected to the main board 210 via an interface board 203. The display unit 201 displays various video signals and character signals, and the front board 202 includes buttons for various key signal inputs and provides a key signal corresponding to a button selected by the user to the main board 210. Also, the display unit 201 includes a proximity sensor and a touch sensor (touch screen) of FIG. 2.

The front board 202 includes a menu key for directly inputting traffic information. The menu key may be configured to be controlled by the key controller 211.

An audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219 and a signal processing unit 215 for processing various voice signals.

The audio board 217 also includes a radio antenna 220 for receiving a radio signal and a tape deck 221 to play an audio tape. The audio board 217 may further include a voice output unit (e.g., an amplifier) 226 for outputting a voice signal processed by the audio board 217.

The voice output unit (amplifier) 226 is connected to a vehicle interface 224. Namely, the audio board 217 and the main board 210 are connected to the vehicle interface 224. A handsfree 225a for inputting a voice signal, an airbag 225b configured for the security of a passenger, a speed sensor 225c for detecting the speed of the vehicle, or the like, may be connected to the vehicle interface 224. The speed sensor 225c calculates a vehicle speed and provides the calculated vehicle speed information to the CPU 212.

The navigation session 300 applied to the telematics terminal 200 generates road guidance information based on the map data and current location information of the vehicle and provides the generated road guidance information to a user.

The display unit 201 detects a proximity touch within a display window via a proximity sensor. For example, when a pointer (e.g., user's finger or stylus) is proximity-touched, the display unit 201 detects the position of the proximity touch and outputs position information corresponding to the detected position to the controller 212.

A voice recognition device (or a voice recognition module) 301 recognizes a voice pronounced by the user and performs a corresponding function according to the recognized voice signal.

The navigation session 300 applied to the telematics terminal displays a travel route on map data, and when the mobile terminal 100 is located within a pre-set distance from a blind spot included in the travel route, the navigation session 300 automatically forms a wireless network together with a terminal (e.g., a vehicle navigation apparatus) mounted in a nearby vehicle or a mobile communication terminal carried around by a nearby pedestrian via radio communication (e.g., a short-range wireless communication network) to receive location information of a nearby vehicle from the terminal mounted in the nearby vehicle and receive location information of the nearby pedestrian from the mobile communication terminal carried around by the nearby pedestrian.

Figure 5:
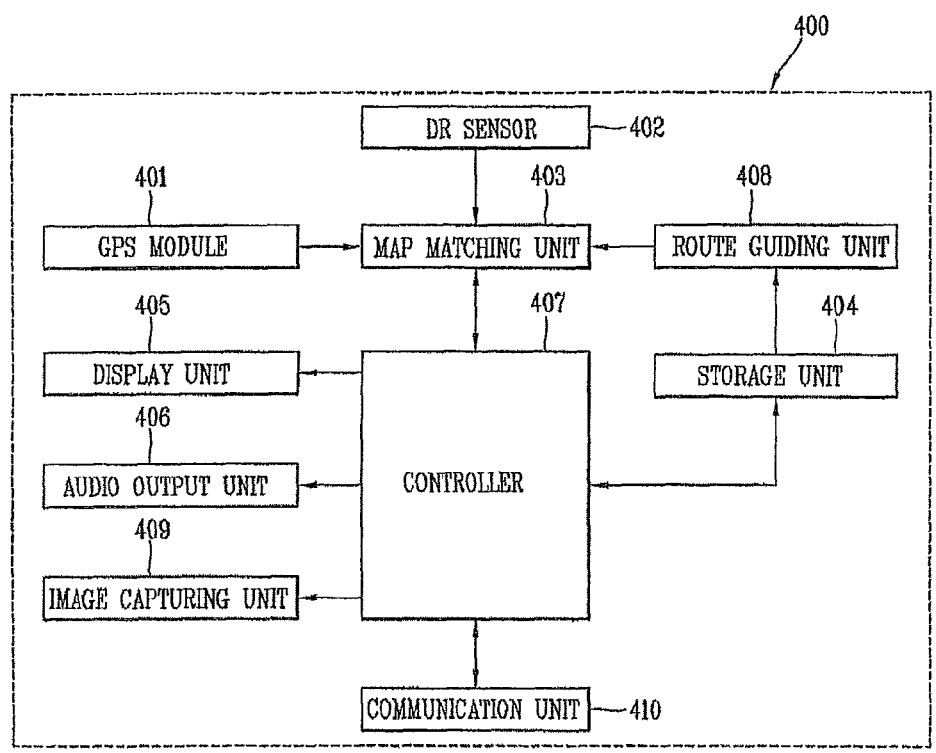
FIG. 5 is a schematic block diagram of a navigation apparatus (vehicle navigation) of a mobile terminal according to a first exemplary embodiment of the present invention.

FIG. 5 is a schematic block diagram showing the configuration of the navigation apparatus 400 (vehicle navigation) according to the first exemplary embodiment of the present invention.

As shown in FIG. 5, the navigation apparatus 400 includes a GPS module 401 for receiving a GPS signal from a satellite and generating first vehicle location data of the navigation apparatus (regarded as the same location as the telematics terminal 200 or the mobile communication terminal 100) based on the received GPS signal; a DR (Dead-Reckoning) sensor 402 for generating second vehicle location data based on a travel direction and the speed of a vehicle; a storage unit (or a memory) 404 for storing map data and various information; a route guiding unit 408 for providing link information aligned according to the link (road) order on the route of the map data; a map matching unit 403 for generating an estimated vehicle location based on the first and second vehicle location data, matching the generated estimated vehicle location and links (map matching links or map matching roads) in the map data according to the link order, and outputting the matched map information (map matching results); a communication unit 410 for receiving real time traffic information from an information providing center and/or a nearby vehicle via a wireless communication network and performing call communication; a controller 407 for generating road guidance information based on the matched map information (map matching results); a display unit 405 for displaying a road guidance map (including information about a point of interest (POI)) included in the road guidance information; a voice output unit 406 for outputting the road guidance voice information (a road guidance voice message) included in the road guidance information; and an image capturing unit (i.e., camera) 409 for capturing an image of a subject according to a control signal from the controller 407. Here, the communication unit 408 may include a handsfree having a Bluetooth module.

The GPS module 401 may be a GPS module 207 of the telematics terminal. The storage unit 404 may be the memory 213 of the telematics terminal. The display unit 405 may be the display unit 201 of the telematics terminal. The voice output unit 406 may be the voice output unit 226 of the telematics terminal. The functions of the route guiding unit 408, the map matching unit 403, and the controller 407 may be controlled by the controller 212 of the telematics terminal.

The technique of generating the estimated vehicle location based on the first vehicle location data generated by the GPS module 401 and the second vehicle location data generated by the DR sensor 402 is known, so its detailed description will be omitted.

The road guidance information may include various information related to traveling such as lane information, speed limit information, turn-by-turn information, traffic safety information, traffic guidance information, vehicle information, road search information, as well as the map data.

The signal received via the GPS module 401 may be configured to provide the location information of the terminal to the navigation apparatus 400 by using a wireless communication scheme such as 802.11, a standard of the wireless network for WLAN including wireless LAN, some infrared communication, and the like, 802.15, a standard for a wireless personal area network (PAN) including Bluetooth™, UWB, ZigBee, and the like, 802.16, a standard for a wireless metropolitan area network (MAN) broadband wireless access (BWA) including a fixed wireless access (FWA), and the like, and 802.20, a standard for the mobile Internet with respect to a mobile broadband wireless access (MBWA) including WiBro, WiMAX, and the like, proposed by IEEE (Institute of Electrical and Electronics Engineers).

The navigation apparatus 400 may further include an input unit. The input unit may select a user-desired function or receive information, and various devices such as a keypad, a touch screen, a jog shuttle, a microphone, and the like, may be used as the input unit.

When a destination is selected by the user, the route guiding unit 408 reads map data corresponding to a driving route from the estimated current vehicle location to the selected destination from the storage unit 404.

The route guiding unit 408 sets the order of the links (roads) included in the read map data according to the order of the route to be traveled, and outputs the set link order information to the map matching unit 403. Here, U.S. Pat. No. 7,302,342 provides a detailed description of the respective links (map matched links) included in the map data.

The map matching unit 403 generates an estimated vehicle location based on the first and second vehicle location data, and reads map data corresponding to the travel route from the route guiding unit 408.

The map matching unit 403 matches the estimated vehicle location and a link (road) included in the map data, and outputs the matched map information (map matching results) to the controller 407. For example, the map matching unit 403 generates the estimated vehicle location based on the first and second location data, matches the generated estimated vehicle location and the links in the map data according to the link order, and outputs the matched map information (map matching results) to the controller 407. The map matching unit 403 may output information regarding road attributes such as one-lane road, two lane road, and the like, included in the matched map information (map matching results) to the controller 407. The function of the map matching unit 403 may be implemented in the controller 407.

The storage unit 404 stores map data. In this case, the stored map data includes geographic coordinates (or longitude/latitude coordinates) representing the latitude and longitude by DMS (Degree/Minute/Second) unit. Here, besides the geographic coordinates, universal transverse mercator (UTM) coordinates, universal polar system (UPS) coordinates, transverse mercator (TM) coordinates, and the like, may be also used as the stored map data.

The storage unit 404 stores various information such as various menu screen images, a point of interest (POI), function characteristics information according to a particular position of map data, and the like.

The storage unit 404 stores various user interfaces (UIs) and/or graphic UIs (GUIs). The storage unit 404 also stores data and programs required for operating the navigation apparatus 400. The storage unit 404 stores the destination information inputted from the user via the input unit. In this case, the destination information may be a destination or one of a destination and a start point.

The display unit 405 displays image information (or road guidance map) included in the road guidance information generated by the controller 407. Here, the display unit 405 includes a touch sensor (touch screen) and/or a proximity sensor. The road guidance information may include various information in relation to traveling (running, driving) such as lane information, speed limit information, turn-by-turn information, traffic safety information, traffic guidance information, vehicle information, road search information, and the like, as well as the map data.

When displaying the image information, the display unit 405 may display various contents such as various menu screen images, road guidance information, and the like, by using a user interface and/or a graphic user interface included in the storage unit 404. Here, the contents displayed on the display unit 405 may include various text or image data (including map data or various information data), and a menu screen image including data such as icons, list menus, combo boxes, and the like.

The voice output unit 406 outputs voice information included in road guidance information (or a voice message with respect to the road guidance information) generated by the controller 407. Here, the voice output unit 406 may be an amplifier or a speaker.

The controller 407 generates the road guidance information based on the matched map information and outputs the generated road guidance information to the display unit 405 and the voice output unit 406. Then, the display unit 405 displays the road guidance information.

The controller 407 receives real time traffic information from the information providing center and/or a terminal (vehicle navigation apparatus) mounted in a nearby vehicle and generates road guidance information.

The controller 407 may be connected to a call center via the communication unit 410 to perform call communication, or transmit or receive information between the navigation apparatus 400 and the call center. Here, the communication unit 410 may include a handsfree module having a Bluetooth™ function using a short-range radio communication scheme.

When a POI search menu is selected by the user, the controller 407 searches a POI located in a route from the current location to a destination, and displays the searched POI on the display unit 405. In this case, the controller 407 searches a POI (namely, a point at which the route does not need to be changed (researched), e.g., a POI positioned at left or right side of the traveling road) positioned on the route and/or a POI (namely, a point at which the route needs to be changed, e.g., a point at which the pre-set route needs to be changed in order to go through a nearby POI) positioned near the route, and displays the searched POI on the display unit 405.

Meanwhile, when the vehicle gets off of the route and a current point of the vehicle is a new road, the controller 407 captures an image of the new road, generates road guide information based on the captured image, and displays and transmits the generated information, to allow vehicles to easily travel on the road. Namely, in the navigation apparatus and method of a mobile terminal according to the first exemplary embodiment of the present invention, when the current traveling road is a new road which has not been updated on map data, the information of the new road is captured and guidance information of the captured road is automatically generated to allow for the generated new road information.

Hereinafter, a navigation apparatus and method of a mobile terminal according to the first exemplary embodiment of the present invention will now be described with reference to FIGS. 5 to 9. Here, the navigation apparatus and method according to the first exemplary embodiment of the present invention may be applicable to various terminals such as a smart phone, a notebook computer, a personal digital assistant (PDA), a portable multimedia player (PMP) as well as to the mobile communication terminal 100, the telematics terminal 200, and the navigation apparatus 400.

Figure 6:
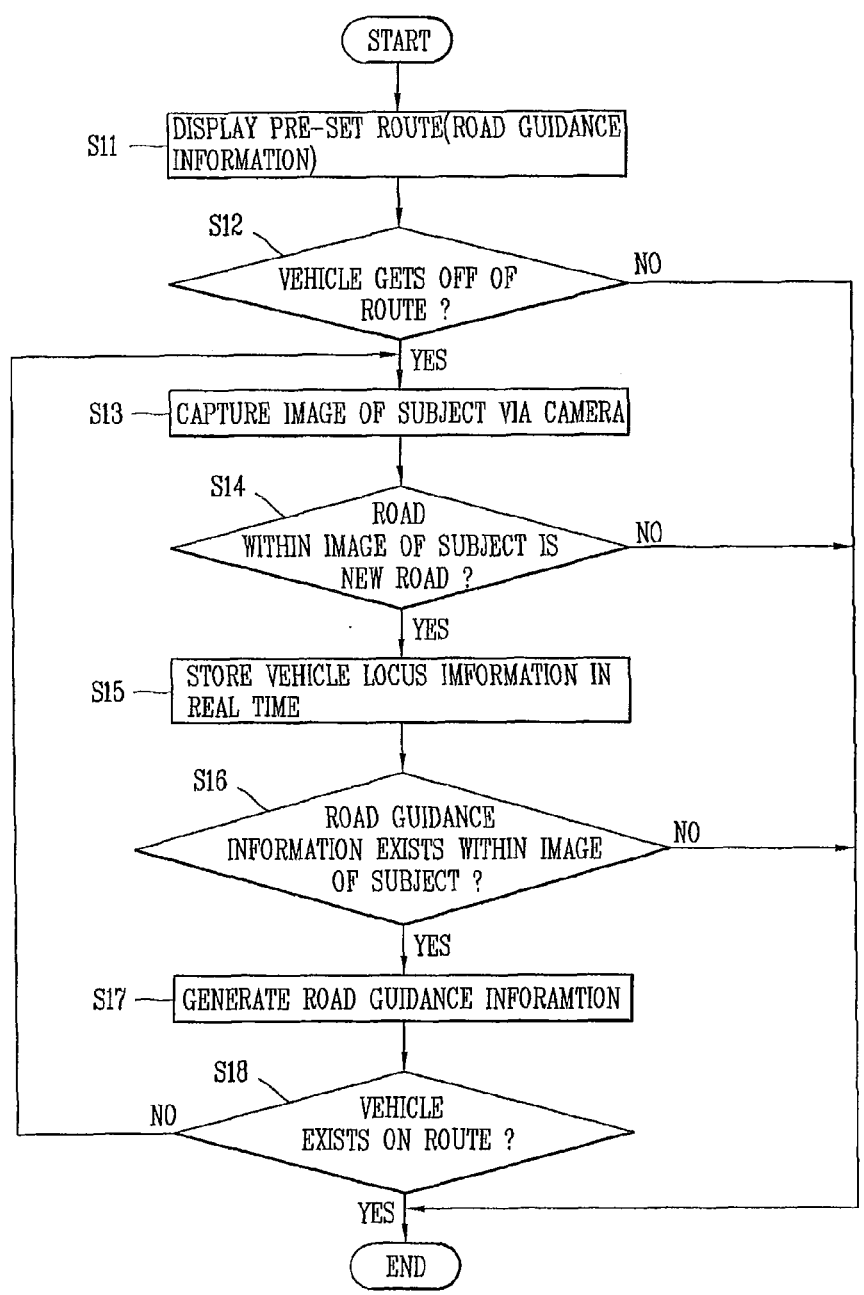
FIG. 6 is a flow chart illustrating the process of a navigation method of a mobile terminal according to the first exemplary embodiment of the present invention.

FIG. 6 is a flow chart illustrating the process of a navigation method of a mobile terminal according to the first exemplary embodiment of the present invention.

First, the controller 407 generates a route (road guidance information) from a current location of the vehicle to a destination in a road guidance mode, and displays the generated route on the display unit 405 (S11).

The controller 407 determines whether or not the vehicle gets off of the route based on the current location information of the vehicle (S12). When the vehicle gets off of the route, the controller 407 operates the camera 409 to capture an image of a subject (S13). The camera 409 is installed to capture an image of a front subject (including road, road signpost, a traffic light, and the like).

The controller 407 receives the captured image of the subject from the camera 409 and determines whether or not the road within the captured image of the subject is a new road (S14). For example, the controller 407 determines whether or not there is a road within the captured image of the subject based on a road pattern recognition information (program) previously set to recognize a road. When there is a road within the capture image of the subject and the road within the captured image of the subject does not exist in the map data, the controller recognizes that the road within the captured image of the subject as a new road. The new road may be a newly constructed road recently which has not been updated on the map data or may be an unpaved road which does not exist in the map data. Here, the technique of determining whether or not there is a road within the captured image of the subject is a known art, so its detailed description will be omitted.

When the road in the captured image of the subject is a new road, the controller 407 stores the image of the subject which has been captured in real time through the camera 4090 as movement locus information of the vehicle in the storage unit 404 (S15). In this case, the controller 407 includes information such as current location coordinates, a vehicle speed, a current time, and the like, in the movement locus information.

After the controller 407 stores the movement locus information of the vehicle in the storage unit 404, it determines whether or not there is road guidance information in the captured image of the subject (S16). For example, when a road signpost is recognized in the captured image of the subject through a program for recognizing a road signpost such as a program for recognizing a vehicle number plate, the controller 407 determines that there is road guidance information in the captured image of the subject.

Also, when a traffic light is recognized in the captured image of the subject through a program for recognizing a traffic light, the controller 407 may determine that there is road guidance information in the captured image of the subject.

When the road guidance information exists in the captured image of the subject, the controller 407 generates the road guidance information (S17). For example, the controller 407 recognizes a road signpost through the program for recognizing a road signpost, recognizes characters of the road signpost through a pre-set character recognition program, generates the recognized characters as road guidance information, matches the generated road guidance information to the vehicle locus information, and stores the matched information (new road information) in the storage unit 404. Also, when a traffic light is recognized in the captured image of the subject through the traffic light recognition program, the controller 407 matches the recognized traffic light to the vehicle locus information and stores the matched information (new road information) in the storage unit 404. Here, when there is a point of interest (POI) in the captured image of the subject and if the user selects a POI registration menu, the controller 407 registers the current captured image of the subject as a POI in the storage unit 404, or when the road in the captured image of the subject is under construction, the controller 407 may input characters informing that the current road is under construction.

The controller 407 may include vehicle left-turn information or vehicle right-turn information in the generated road guidance information based on vehicle rotation information.

Meanwhile, when the vehicle enters the route (road guidance information) while the vehicle locus information is being stored in real time, the controller 407 stops the operation of storing the vehicle locus information in real time (S18). For example, when the vehicle enters the route (road guidance information) and currently is located in the route while the new road information is being generated, the vehicle performs general route guidance.

In this manner, in the navigation apparatus and method of a mobile terminal according to the first exemplary embodiment of the present invention, if the currently traveling road is a new road which has not been updated in the map data, information of the new road is captured, and guidance information of the captured road is automatically generated, so that the generated new road information can be utilized. Also, in the navigation apparatus and method of a mobile terminal according to the first exemplary embodiment of the present invention, the generated new road information is transmitted to a nearby vehicle or the information providing center via the communication unit 410, so that vehicles can easily and safely travel on the new road.

Hereinafter, a navigation apparatus and method of a mobile terminal according to a second exemplary embodiment of the present invention will now be described with reference to FIGS. 5 to 7. Here, the navigation apparatus and method of a mobile terminal according to the second exemplary embodiment of the present invention may be applicable to various terminals such as a smart phone, a notebook computer, a personal digital assistant (PDA), a portable multimedia player (PMP) as well as to the mobile communication terminal 100, the telematics terminal 200, and the navigation apparatus 400.

Figure 7:
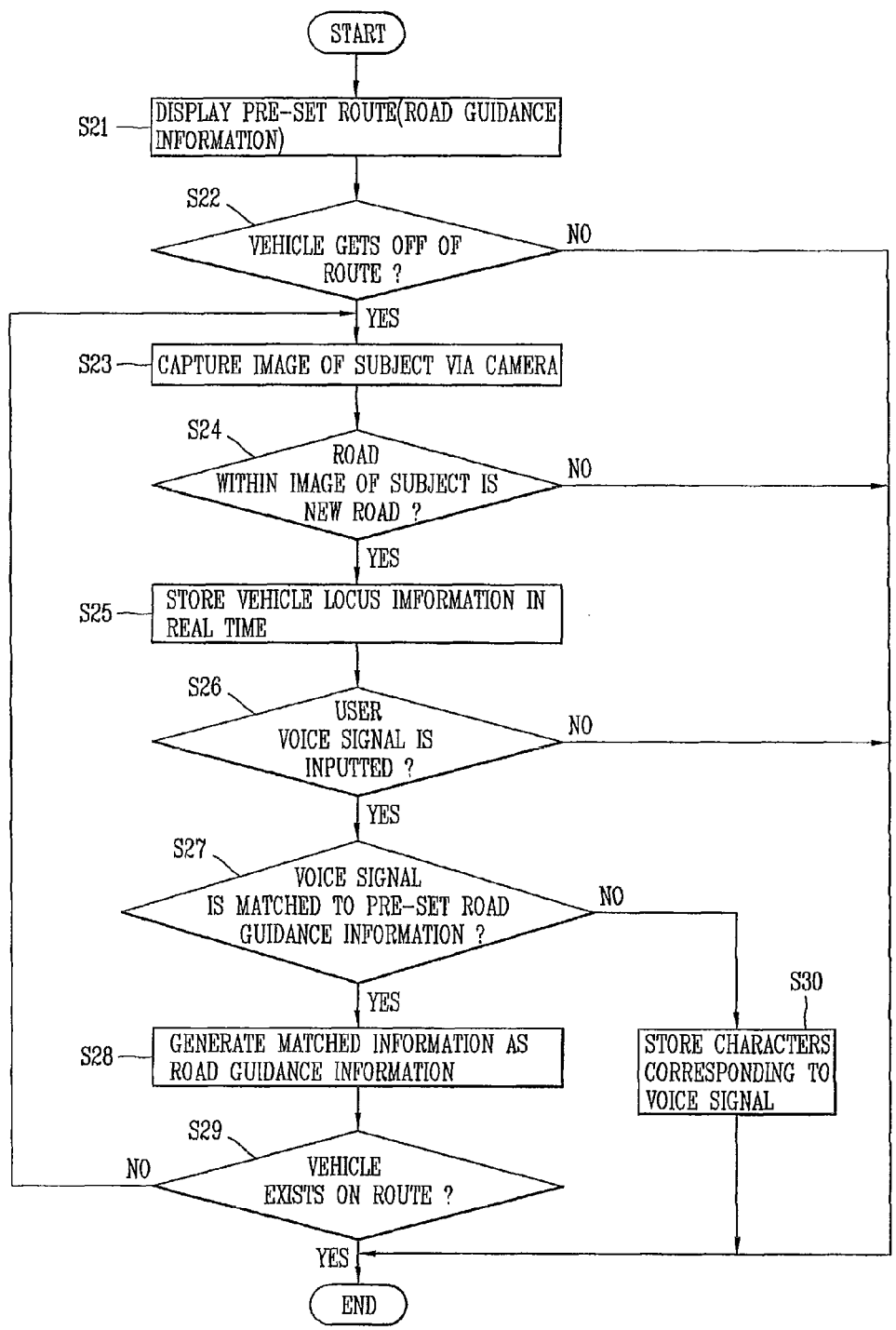
FIG. 7 is a flow chart illustrating the process of a navigation method of a mobile terminal according to a second exemplary embodiment of the present invention.

FIG. 7 is a flow chart illustrating the process of a navigation method of a mobile terminal according to the second exemplary embodiment of the present invention.

First, the controller 407 generates a route (road guidance information) from a current location of the vehicle to a destination in a road guidance mode, and displays the generated route on the display unit 405 (S21).

The controller 407 determines whether or not the vehicle gets off of the route based on the current location information of the vehicle (S22). When the vehicle gets off of the route, the controller 407 operates the camera 409 to capture an image of a subject (S23). The camera 409 is installed to capture an image of a front subject.

The controller 407 receives the captured image of the subject from the camera 409 and determines whether or not the road within the captured image of the subject is a new road (S24). For example, the controller 407 determines whether or not there is a road within the captured image of the subject based on a road pattern recognition information (program) previously set to recognize a road. When there is a road within the capture image of the subject and the road within the captured image of the subject does not exist in the map data, the controller recognizes that the road within the captured image of the subject as a new road. The new road may be a newly constructed road recently which has not been updated on the map data or may be an unpaved road which does not exist in the map data. Here, the technique of determining whether or not there is a road within the captured image of the subject is a known art, so its detailed description will be omitted.

When the road in the captured image of the subject is a new road, the controller 407 stores the image of the subject which has been captured in real time through the camera 4090 as movement locus information of the vehicle in the storage unit 404 (S25). In this case, the controller 407 includes information such as current location coordinates, a vehicle speed, a current time, and the like, in the movement locus information.

After the controller 407 stores the movement locus information of the vehicle in the storage unit 404, it determines whether or not a user voice has been inputted through a microphone (not shown) (S26).

When a user voice is inputted through the microphone (not shown), the controller 407 recognizes character information corresponding to the inputted voice signal and determines whether or not the recognized character information is matched to pre-set road guidance information (S27). For example, when the character information corresponding to the voice signal is matched to pre-set road guidance information such as left-turn, right-turn, traffic light, under construction (road up), a POI, and the like, the controller 407 generates the matched character information as road guidance information (S28). In this case, the controller 407 matches the generated road guidance information to the vehicle locus information, and generates and stores the matched result as new road information.

Meanwhile, if the recognized character information is not matched to the pre-set road guidance information, the controller 407 generates the recognized character information as the road guidance information (S30). In this case, the controller 407 stores the generated road guidance information together with the vehicle locus information to thus generate new road information.

Thereafter, when the vehicle enters the route (road guidance information) while the vehicle locus information is being stored in real time, the controller 407 stops the operation of storing the vehicle locus information in real time (S29). For example, when the vehicle enters the route (road guidance information) and currently is located in the route while the new road information is being generated, the vehicle performs general route guidance.

In this manner, in the navigation apparatus and method of a mobile terminal according to the second exemplary embodiment of the present invention, if the currently traveling road is a new road which has not been updated in the map data, information of the new road is captured, and guidance information of the captured road is generated based on a user voice to thereby effectively generate new road information.

Hereinafter, a navigation apparatus and method of a mobile terminal according to a third exemplary embodiment of the present invention in which a user can set a preferred route (including a new road) will now be described with reference to FIGS. 5 to 8. Here, the navigation apparatus and method of a mobile terminal according to the third exemplary embodiment of the present invention may be applicable to various terminals such as a smart phone, a notebook computer, a personal digital assistant (PDA), a portable multimedia player (PMP) as well as to the mobile communication terminal 100, the telematics terminal 200, and the navigation apparatus 400.

Figure 8:
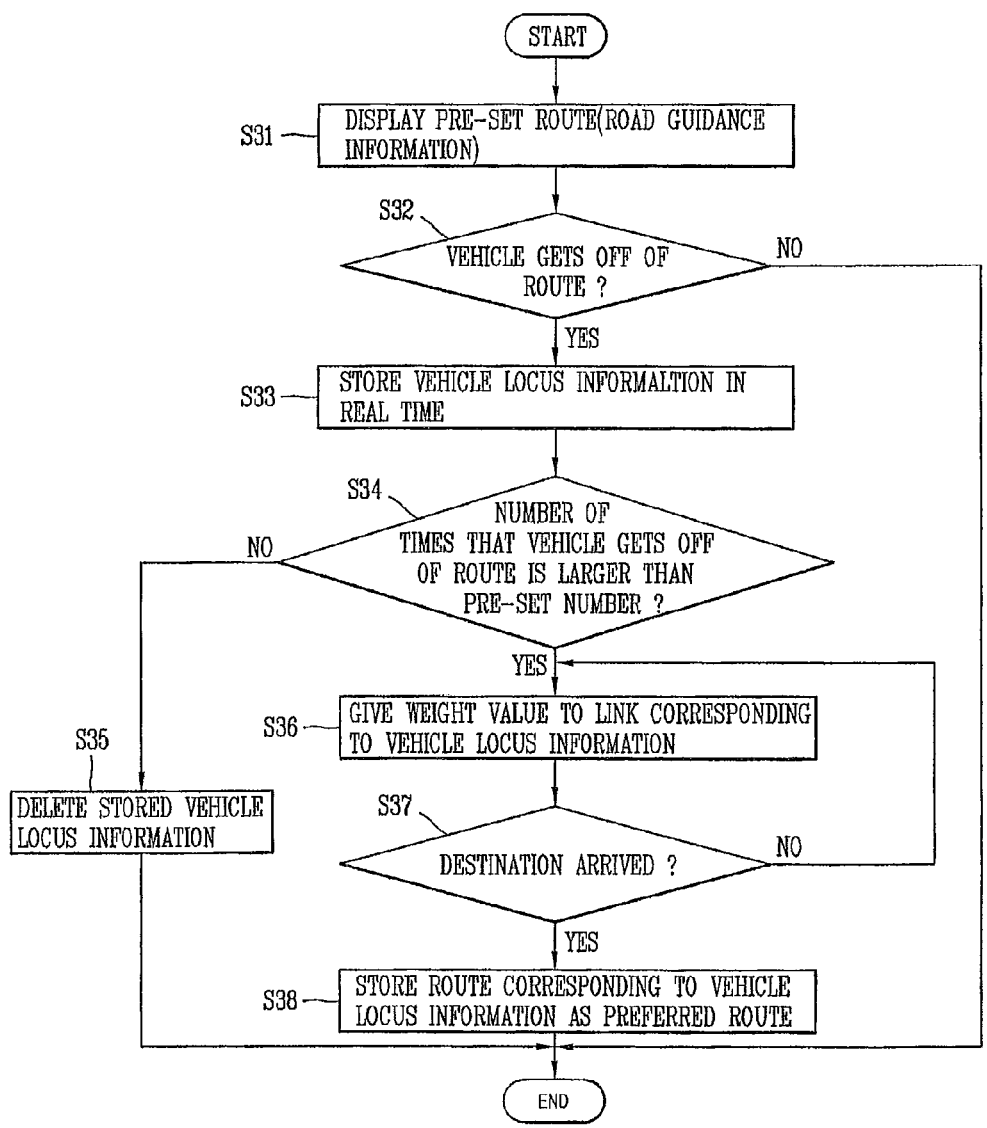
FIG. 8 is a flow chart illustrating the process of a navigation method of a mobile terminal according to a third exemplary embodiment of the present invention.

FIG. 8 is a flow chart illustrating the process of a navigation method of a mobile terminal according to the third exemplary embodiment of the present invention.

First, the controller 407 generates a route (road guidance information) from a current location of the vehicle to a destination in a road guidance mode, and displays the generated route on the display unit 405 (S31).

The controller 407 determines whether or not the vehicle gets off of the route based on the current location information of the vehicle (S32). When the vehicle gets off of the route, the controller 407 stores movement locus information of the vehicle in the storage unit 404 in real time (S33). In this case, the controller 407 includes information such as current location coordinates, a vehicle speed, a current time, and the like, in the movement locus information.

After storing the movement locus information of the vehicle in the storage unit 404 in real time, the controller 407 checks the number of times that the vehicle has gotten off of the route. That is, the controller 407 determines whether or not the number of times that the vehicle has gotten off of the route is larger than a pre-set number (e.g., two times or larger) (S34). For example, when the vehicle gets off of the route (one time), the controller 407 may provide an optimum route for entering the normal route from the current location. However, when the vehicle gets off of the guided route again (two times), the controller 407 determines that the vehicle has gotten off of the route by more than the pre-set number of times (e.g., two times).

Meanwhile, when the number of times that the vehicle has gotten off of the route is smaller than the pre-set number (e.g., one time) and the vehicle enters the normal route, the controller 407 regards that the vehicle has gotten off of the route by the driver's mistake and deletes the stored movement locus information of the vehicle (S35). For example, when the vehicle gets off of the route, the controller 407 provides an optimum route for entering the normal route from the current location, and when the vehicle enters the provided route, the controller 407 deletes the stored movement locus information of the vehicle.

When the number of times that the vehicle has gotten off of the route is larger than the pre-set number (e.g., two times), the controller 407 gives a weight value (cost) to the links (roads) corresponding to the stored movement locus information of the vehicle, and stores the weight value-given links in the storage unit 404 (S36). Here, the weight value is a value for setting the links corresponding to the stored movement locus information of the vehicle as a user preferred route. The weight value-given links have a higher priority level.

The controller 407 determines whether or not the vehicle has arrived at the destination while the movement locus information of the vehicle is stored in the storage unit 404 in real time (S37). When the vehicle has arrived at the destination, the controller 407 stores the vehicle locus (vehicle locus information) along which the vehicle travels from the point from which it has gotten off as a user preferred route in the storage unit 404 (S38). Accordingly, when the user selects the road guidance mode and searches the route from a current location to the destination, the controller 407 may guide the stored user preferred route, thus enhancing user satisfaction (namely, it can guide the user preferred route).

Hereinafter, a navigation apparatus and method of a mobile terminal according to a fourth exemplary embodiment of the present invention in which a user can set a preferred route (including a new road) will now be described with reference to FIGS. 5 and 9 to 11. Here, the navigation apparatus and method of a mobile terminal according to the third exemplary embodiment of the present invention may be applicable to various terminals such as a smart phone, a notebook computer, a personal digital assistant (PDA), a portable multimedia player (PMP) as well as to the mobile communication terminal 100, the telematics terminal 200, and the navigation apparatus 400.

Figure 9:
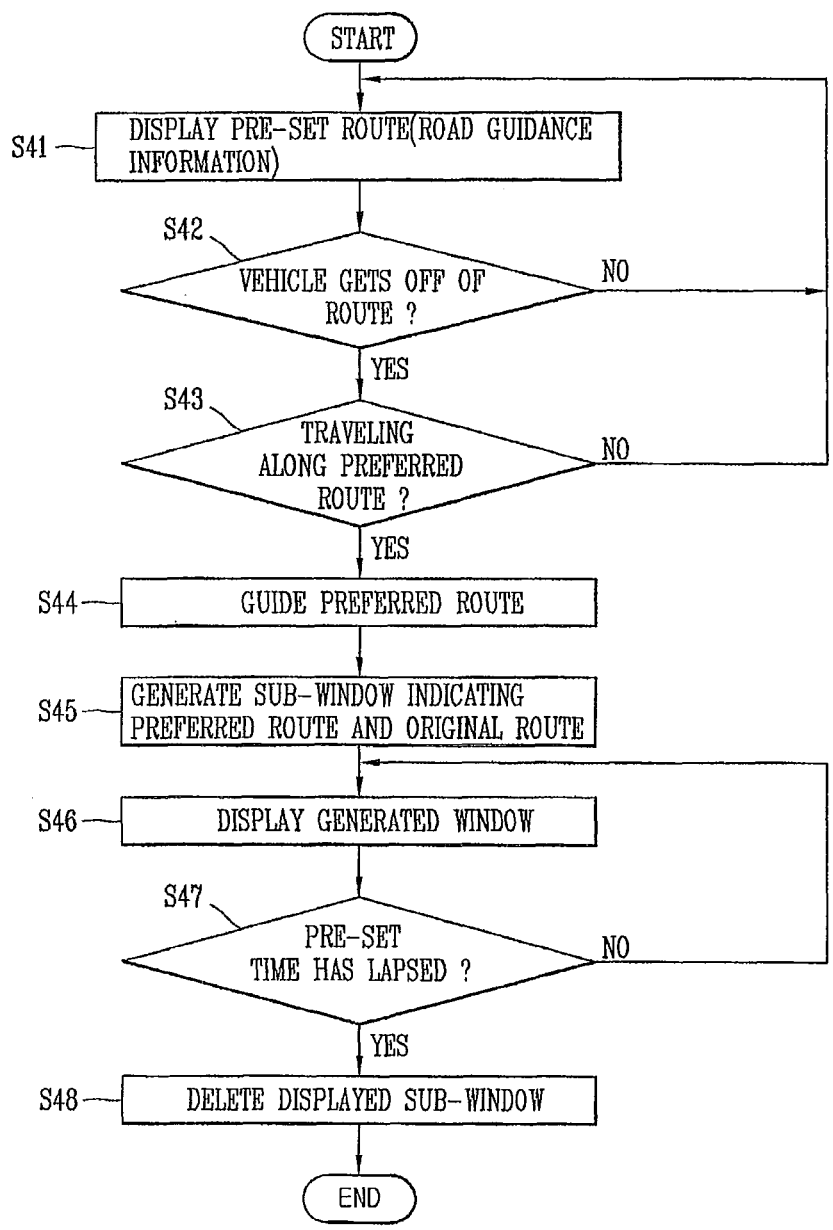
FIG. 9 is a flow chart illustrating the process of a navigation method of a mobile terminal according to a fourth exemplary embodiment of the present invention.

FIG. 9 is a flow chart illustrating the process of a navigation method of a mobile terminal according to the fourth exemplary embodiment of the present invention.

First, the controller 407 generates a route (road guidance information) (original route) from a current location of the vehicle to a destination in a road guidance mode, and displays the generated route on the display unit 405 (S41).

The controller 407 determines whether or not the vehicle gets off of the route based on the current location information of the vehicle (S42). When the vehicle gets off of the route, the controller 407 generates a pop-up window inquiring whether to travel along a preferred route from the current location to the destination and displays the generated pop-up window 10-1 on the display unit 405.

Figure 10:
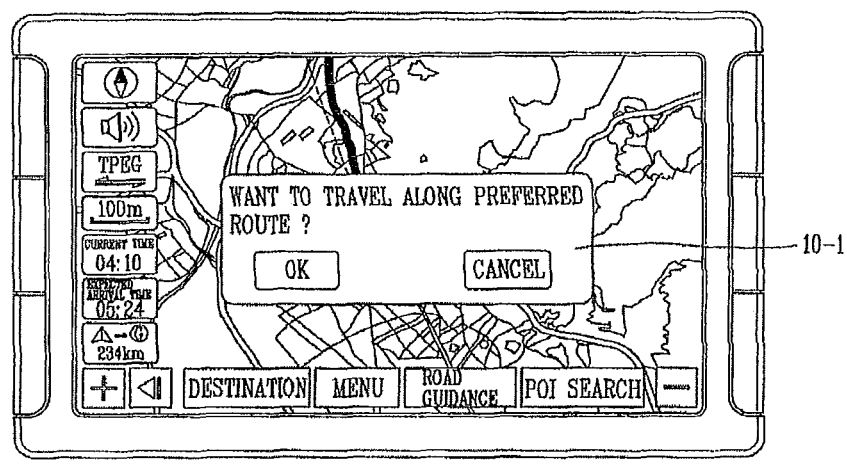
FIG. 10 illustrates a pop-up window according to the fourth exemplary embodiment of the present invention.

FIG. 10 illustrates a pop-up window according to the fourth exemplary embodiment of the present invention.

As shown in FIG. 10, when the vehicle gets off of the route, the controller 407 generates the pop-up window inquiring whether to travel along a preferred route from the current location to the destination and displays the generated pop-up window 10-1 on the display unit 405.

When an OK key displayed on the pop-up window 10-1 is selected by the user (S43), the controller 407 reads the preferred route from the current location to the destination from the storage unit 404 and displays the read preferred route on the display unit 405. In this case, the controller 407 performs road guiding based on the read preferred route (S44). Meanwhile, when a minimum key displayed on the pop-up window 10-1 is selected by the user, the controller 407 provides the pre-set original route.

When guiding the preferred route or when displaying the pop-up window 10-1, the controller 407 generates a sub-window showing both the original route and the preferred route to the destination so that the user can easily check the difference between the original route and the preferred route to the destination (S45).

Figure 11:
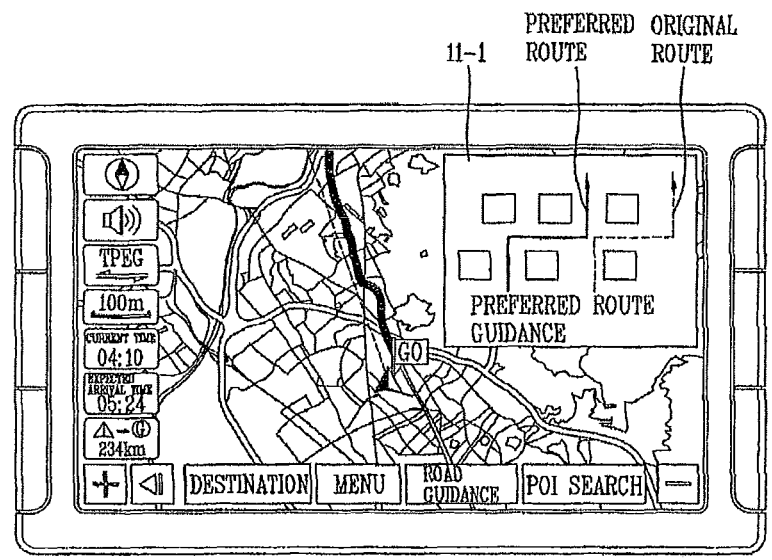
FIG. 11 illustrates a sub-window according to the fourth exemplary embodiment of the present invention.

FIG. 11 illustrates a sub-window according to the fourth exemplary embodiment of the present invention.

As shown in FIG. 11, when guiding the preferred route or when displaying the pop-up window 10-1, the controller 407 generates the sub-window 11-1 showing both the original route and the preferred route to the destination allowing the user to easily check the difference between the original route and the preferred route to the destination, and displays the generated sub-window 11-1 on the main screen (map data) of the display unit 405 (S46).

Thereafter, the controller 407 determines whether or not a pre-set time (e.g., three to five seconds) has lapsed (S47). When the pre-set time has lapsed, the controller 407 deletes the sub-window 11-1 (S48). For example, with the sub-window 11-1 displayed on the display unit 405, when three seconds has lapsed, the controller 407 deletes the sub-window 11-1 in order to allow the user to view map data which has been covered by the sub-window 11-1.

In this manner, when the user selects the road guidance mode and searches the route from the current location to the destination, the controller 407 guides the stored user preferred route through a pop-up window, thus enhancing user satisfaction (namely, it can effectively provides the user preferred route).

Hereinafter, a navigation apparatus and method of a mobile terminal according to a fourth exemplary embodiment of the present invention in which a user can set a preferred route (including a new road) will now be described with reference to FIGS. 5 and 12. Here, the navigation apparatus and method of a mobile terminal according to the third exemplary embodiment of the present invention may be applicable to various terminals such as a smart phone, a notebook computer, a personal digital assistant (PDA), a portable multimedia player (PMP) as well as to the mobile communication terminal 100, the telematics terminal 200, and the navigation apparatus 400.

Figure 12:
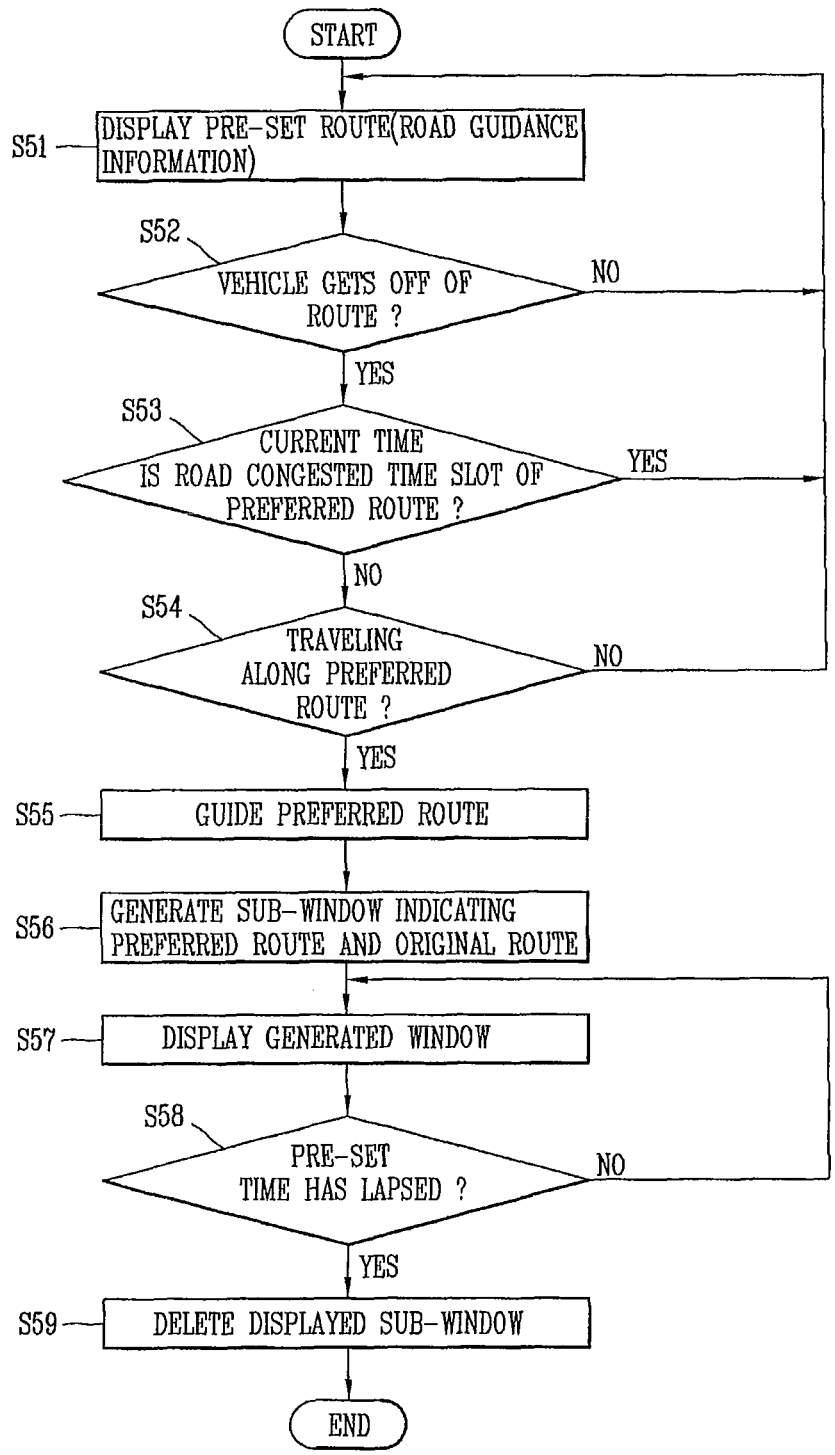
FIG. 12 is a flow chart illustrating the process of a navigation method of a mobile terminal according to a fifth exemplary embodiment of the present invention.

FIG. 12 is a flow chart illustrating the process of a navigation method of a mobile terminal according to the fifth exemplary embodiment of the present invention.

First, the controller 407 generates a route (road guidance information) (original route) from a current location of the vehicle to a destination in a road guidance mode, and displays the generated route on the display unit 405 (S51).

The controller 407 determines whether or not the vehicle gets off of the route based on the current location information of the vehicle (S52). When the vehicle gets off of the route, the controller 407 determines whether or not a current time is a road congested time slot of a previously stored preferred route before displaying the stored preferred route (S53). Here, the road congested time slot of the preferred route may be received from the information providing center or may be previously set by the user.

When the vehicle gets off of the route and the current time is the road congested time slot of the previously stored preferred route, the controller 407 displays the route (the original route).

When the vehicle gets off of the route and the current time is not the road congested time slot of the previously stored preferred route but a traffic flow smooth time slot, the controller 407 generates a pop-up window inquiring whether to travel along the preferred route from the current location to the destination and displays the generated pop-up window on the display unit 405.

When an OK key displayed on the pop-up window is selected by the user (S54), the controller 407 reads the preferred route from the current location to the destination from the storage unit 404 and displays the read preferred route on the display unit 405. In this case, the controller 407 performs road guidance based on the read preferred route (S55). Meanwhile, if a minimum key displayed on the pop-up window is selected by the user, the controller 407 guides the pre-set original route.

When guiding the preferred route or when displaying the pop-up window, the controller 407 generates a sub-window showing both the original route and the preferred route to the destination allowing the user to easily check the difference between the original route and the preferred route to the destination (S56), and displays the generated sub-window 11-1 on the main screen (map data) of the display unit 405 (S57).

Thereafter, the controller 407 determines whether or not a pre-set time (e.g., three to five seconds) has lapsed (S58). When the pre-set time has lapsed, the controller 407 deletes the sub-window 11-1 (S59). For example, with the sub-window 11-1 displayed on the display unit 405, when three seconds has lapsed, the controller 407 deletes the sub-window 11-1 in order to allow the user to view map data which has been covered by the sub-window 11-1.

In this manner, when the user selects the road guidance mode and searches the route from the current location to the destination, the controller 407 guides the stored user preferred route by discriminating the congested time slot, thus enhancing user satisfaction (namely, it can effectively provides the user preferred route).

Meanwhile, in the navigation method and apparatus of a mobile terminal according to the exemplary embodiments of the present invention, the preferred route (including a POI) may be transmitted to the information providing center or terminals of nearby vehicles through a communication network, and when map data including the preferred route is transmitted via the communication network, data corresponding to the preferred route may be preferentially transmitted.

As described so far, the navigation method and apparatus of a mobile terminal according to the exemplary embodiments of the present invention have many advantages as follows.

That is, when a currently traveling road is a new road which has not been updated in map data, information of the new road is captured and guidance information of the captured image of the road is automatically generated, thereby utilizing the generated new road information.

Also, because the generated new road information is transmitted to nearby vehicles or the information providing center via the communication unit 410, the vehicles can easily and safely travel on the new road.

In addition, when the currently traveling road is a new road which has not been updated in the map data, information of the new road is captured, and the guidance information of the captured image of the road is generated based on the user voice, thus effectively generating new road information.

Moreover, when a route from the current location to the destination is searched, the stored user preferred information is guided to enhance the user satisfaction.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A navigation apparatus for use with a transportation device, the apparatus comprising:
    a storage unit configured to store map data;
    a display unit configured to display the map data and a route from a current location to a destination on the map data;
    an image capturing unit for capturing an image of a road; and
    a controller configured to receive the captured image and determine therefrom whether or not the transportation device is on an unmapped road based on an indication that the transportation device is on a road not reflected in the map data, to obtain unmapped road information and road guidance information for the unmapped road based on the determination result, and to store the unmapped road information and the road guidance information for the unmapped road as part of the map data, to check the number of times that the transportation device gets off of the route, to store locus information when the transportation device gets off the route, and when the number of times that the transportation device gets off of the route is larger than a pre-set number, the controller gives a weight value to the link or links corresponding to the locus information, wherein the weight value is a value for setting the locus information as a preferred route.

2. The apparatus of claim 1, wherein the controller is configured to store the locus information of the transportation device with the corresponding weight value-given link or links as the preferred route in the storage unit.

3. The apparatus of claim 2, wherein the controller is configured to display a window inquiring whether to travel along the preferred route on the display unit when a vehicle gets off of the route.

4. The apparatus of claim 2, wherein the controller is configured to display a window showing the route and the preferred route on the map data when the transportation device gets off of the route.

5. The apparatus of claim 4, wherein the controller is configured to delete the window showing the route and the preferred route when a pre-set time lapses.

6. The apparatus of claim 4, wherein the controller is configured to check whether or not a current time is a road congested time slot of the preferred route when the transportation device gets off of the route, and when the current time is not the road congested time slot of the preferred route, the controller is configured to display the window showing the route and the preferred route on the map data.

7. The apparatus of claim 1, wherein the controller is configured to delete the stored locus information when the number of times that the transportation device gets off of the route is smaller than the pre-set number.

8. The apparatus of claim 1, further comprising:
    a camera for capturing an image of a locus of the transportation device when the transportation device gets off of the route,
    wherein the controller is configured to store the captured image in the storage unit and to generate road guidance information corresponding to the locus of the transportation device based on the image which has been captured by the camera.

9. The apparatus of claim 1, further comprising:
    a camera for capturing an image of a locus of the transportation device when the transportation device gets off of the route,
    wherein the controller is configured to store the captured image in the storage unit and to generate the road guidance information corresponding to the locus of the transportation device based on a voice signal of the user.

* * * * *